(12) United States Patent
Borgel et al.

(10) Patent No.: US 9,086,191 B2
(45) Date of Patent: Jul. 21, 2015

(54) METHOD FOR SAFELY PREVENTING BACKFLOWING IN THE CONVEYING OF A FLUID

(75) Inventors: Franz Borgel, Dirmstein (DE); Alfred Krause, Speyer (DE); Mirko Kreitschmann, Mannheim (DE); Anton Meier, Birkenheide (DE); Frank-Friedrich Pape, Kleinniedesheim (DE); Wolfgang Reif, Frankenthal (DE); Michael Salla, Meckenheim (DE)

(73) Assignee: BASF SE, Ludwigshafen (DE)

( * ) Notice: Subject to any disclaimer, the term of this patent is extended or adjusted under 35 U.S.C. 154(b) by 772 days.

(21) Appl. No.: 13/001,467

(22) PCT Filed: Jun. 16, 2009

(86) PCT No.: PCT/EP2009/057462
§ 371 (c)(1),
(2), (4) Date: Mar. 29, 2011

(87) PCT Pub. No.: WO2009/156304
PCT Pub. Date: Dec. 30, 2009

(65) Prior Publication Data
US 2011/0180151 A1 Jul. 28, 2011

(30) Foreign Application Priority Data
Jun. 25, 2008 (EP) .................... 08158969

(51) Int. Cl.
*F17D 1/08* (2006.01)
*F17D 1/14* (2006.01)
*F16K 15/00* (2006.01)
(52) U.S. Cl.
CPC .. *F17D 1/14* (2013.01); *F16K 15/00* (2013.01)

(58) Field of Classification Search
CPC ...... B67D 7/0266; B67D 7/0272; F17D 1/14; F16K 15/00
USPC ...................... 137/12, 14, 206, 209
See application file for complete search history.

(56) References Cited

U.S. PATENT DOCUMENTS

| 3,361,146 A | 1/1968 | Patterson et al. |
| 3,746,027 A | 7/1973 | Elliott |

(Continued)

FOREIGN PATENT DOCUMENTS

WO  WO-2006/081745 A1  8/2006

*Primary Examiner* — William McCalister
(74) *Attorney, Agent, or Firm* — Drinker Biddle & Reath LLP (57) ABSTRACT

A method for reliably avoiding backflow in the transport of a liquid under pressure via a transport pipe (1), in which a shut-off device (2) with differential pressure switching is arranged, into a container (3) which is under pressure and which comprises the liquid to be transported and/or another liquid is proposed, wherein a pressure accumulator (4) which is filled with the liquid to be transported up to a certain level and above the liquid level, in direct contact with the liquid to be transported, with an inert gas is arranged in the transport pipe (1) upstream from the shut-off device (2) in the transport direction, the inert gas being provided in the pressure accumulator (4) under an excess pressure and in an amount relative to the container (3) to be filled which are designed so that, in the case of a drop in the pressure in the transport pipe (1), the inert gas ensures a positive pressure difference in the transport pipe (1) to the container (3) over a period which is at least as long as the reaction time of the shut-off device (2) and the shut-off device (2) has an emptying pipe (6) with emptying valve (7).

20 Claims, 5 Drawing Sheets

(56) References Cited

U.S. PATENT DOCUMENTS

| | | | |
|---|---|---|---|
| 6,149,384 A * | 11/2000 | Feres | 415/169.1 |
| 6,267,132 B1 * | 7/2001 | Guarneri | 137/14 |
| 6,273,105 B1 * | 8/2001 | Jones | 134/64 R |
| 6,383,291 B1 * | 5/2002 | Konishi | 118/313 |
| 6,607,141 B2 * | 8/2003 | Paarporn | 237/8 R |
| 2007/0221271 A1 * | 9/2007 | Sasaki et al. | 137/7 |
| 2010/0129250 A1 | 5/2010 | He | |

* cited by examiner

METHOD FOR SAFELY PREVENTING BACKFLOWING IN THE CONVEYING OF A FLUID

PRIORITY

Priority is claimed as a national stage application, under 35 U.S.C. §371, to PCT/EP2009/057462, filed Jun. 16, 2009, which claims priority to European application 08158969.9, filed Jun. 25, 2008. The disclosures of the aforementioned priority applications are incorporated herein by reference in their entirety.

DESCRIPTION

The invention relates to a method for reliably avoiding backflow in the transport of a liquid under pressure via a transport pipe into a container and a use of the method for the preparation of ethanolamines, isopropanolamines, alkylalkanolamines, alkyldialkanoldiamines and/or dialkylalkanolamines by reaction of alkylene oxides with amines or ammonia.

In chemical process engineering, liquids are frequently transported under pressure into containers which are under pressure. Owing to a hydrostatic pressure gradient, however, the transport can be effected in particular by means of a feed pump. In the case of a pressure drop, in particular failure of the feed pump, liquid may flow out of the container in a direction opposite to the transport direction back into the transport pipe. This can lead to problems in the transport pipe.

Usually, the pressure transmitted by backflow can be eliminated by safety valves. However, this is problematic for a multiplicity of substances since the release may result in toxic and/or ignitable gas mixtures. Furthermore, this approach is prohibited in the case of substances which undergo a highly exothermic reaction with other substances which can enter this pipeline via backflow or polymerize in the presence of small amounts of these substances, tend to decompose or are decomposed or polymerized by the heat input of such a reaction.

Shut-off devices which close in the event of a pressure drop are therefore provided in the transport pipe. However, the closing time of the shut-off devices cannot be arbitrarily shortened, so that liquid may flow back in a direction opposite to the transport direction in the transport pipe during the reaction time of the shut-off device.

It was therefore an object of the invention to provide a method which reliably prevents backflow of liquid from a container into which liquid is transported under pressure, a shut-off device having a finite closing time being arranged in the transport pipe, even during the closing time of the shut-off device.

It was moreover an object of the invention to provide a method for reliably avoiding backflow into one or more feed pipes for one or more alkylene oxides in a process for the preparation of ethanolamines, isopropanolamines, alkylalkanolamines, alkyldialkanoldiamines and/or dialkylalkanolamines by reaction of the one or more alkylene oxides with alkylamines or ammonia, in particular from the reactor in which the reaction is carried out into the feed pipe for the one or more alkylene oxides.

The backflow into the feed pipe for the one or more alkylene oxides can also take place from the metering system for a component other than the alkylene oxide or oxides in the reactor. According to the invention, such a backflow is also to be avoided.

The object is achieved by a method for reliably avoiding backflow in the transport of a liquid under pressure via a transport pipe, in which a shut-off device with differential pressure switching is arranged, into a container which is under pressure and which comprises the liquid to be transported and/or another liquid, wherein a pressure accumulator which is filled with the liquid to be transported up to a certain level and above the liquid level, in direct contact with the liquid to be transported, with an inert gas is arranged in the transport pipe upstream from the shut-off device in the transport direction, the inert gas being provided in the pressure accumulator under an excess pressure and in an amount relative to the container to be filled which are designed so that, in the case of a drop in the pressure in the transport pipe, the inert gas ensures a positive pressure difference in the transport pipe to the container over a period which is at least as long as the reaction time of the shut-off device, the shut-off device having an emptying pipe with emptying valve.

The method according to the invention relates to the transport of a liquid (first liquid) under pressure via a transport line into a container which is under pressure and which comprises a second liquid which is the same as the liquid to be transported or another liquid. The transport of the liquid can be effected by hydrostatic pressure difference. Preferably, the liquid is transported by means of a pump.

The pump can advantageously be a volumetric pump, in particular a piston pump, a diaphragm pump or a gear pump.

Diaphragm pumps are advantageous particularly in the case of high feed pressures and for the transport of liquids having corrosive properties.

It is also possible to use a centrifugal pump which advantageously has backflow-reducing devices, in particular one or more nonreturn valves, preferably on the pressure side of the centrifugal pump.

Arranged in the transport pipe is a shut-off device which prevents backflow of the liquid in the event of a pressure drop in the transport pipe. However, the fact that shut-off devices always have a certain reaction time which it is not possible to fall below and which, according to the prior art at present, is in the region of seconds, frequently in the region of about 2 s, is problematic.

The shut-off device is provided with an emptying device, i.e. a bleed pipe or emptying pipe with bleed valve or emptying valve.

In one embodiment, the emptying pipe with emptying valve is a single emptying pipe with single emptying valve, on both sides of the single emptying pipe with single emptying valve a single block closing valve being provided.

Because the shut-off device is also provided with an emptying device for the liquid, in addition to the avoidance of physical contact of backflowing liquid with liquid from the transport pipe indirect thermal contact is also avoided, for example, by preventing hot liquid from the container into which the liquid is transported from coming into direct thermal contact by heat conduction with cold liquid which is transported via the transport pipe into the container.

Reaction time of the shut-off device is understood as meaning the period from the detection of the triggering signal for shut-off to complete closing of the valve.

There is also provided a double emptying pipe with double emptying valve.

It is advantageous to form the shut-off device in such a way that in each case a double closing valve is provided on both sides, i.e. downstream and upstream of the emptying pipe with double emptying valve.

The shut-off device is preferably controlled via differential pressure switching. For this purpose, however, other devices registering backflow, for example a mass flow rate measurement, are also suitable.

According to the invention, in the case of transport of the liquid by means of a pump, a pressure accumulator is arranged in the transport pipe between pump and container to be filled, before the container to be filled. The pressure accumulator is partly filled with the liquid to be transported. An inert gas is introduced above the liquid level in the pressure container via a feed pipe. Such devices are known in the prior art for damping pulsations. According to the invention, however, a pressure accumulator is used which is dimensioned so that it maintains a positive pressure difference in the transport direction in the case of a pressure drop in the transport pipe. The pressure accumulator thus acts as a pressure buffer or prestressed pressure spring.

The pressure accumulator preferably comprises a vertically arranged pipe which ensures good level regulation in combination with as small a liquid holdup as possible, i.e. is designed so that very small variations in liquid volume result in maximum liquid level differences. The pipe is connected, preferably at its lower end, to the transport pipe for the liquid.

Advantageously, the connection at the lower end of the pipe to the transport pipe serves, however, only for removal of liquid and the feed is preferably effected above the lower end of the pipe. As a result, good flow of the liquid through the pipe and liquid residence times in the pipe which are as short as possible are achieved. This is advantageous especially in the case of liquids tending to polymerize.

The pipe is equipped with a level measurement for the liquid.

At the upper end, the pipe is connected to a container which serves for holding the liquid up to a certain level. Above the liquid level, an inert gas, frequently nitrogen, is introduced into the pressure accumulator via a feed opening.

The container at the upper end of the pipe is preferably rounded and symmetrical.

The pipe of the pressure accumulator frequently has a length in the range from 1 to 5 m, preferably from 4 to 5 m, and a diameter in the range from 100 to 300 mm, preferably in a range from 90 to 150 mm.

The pressure-tight container at the upper end of the pressure accumulator is advantageously dimensioned to take into account the following boundary conditions:
 minimum pressure in the containers to be filled,
 maximum pressure in the pressure accumulator,
 switching point and reaction time of the differential pressure switching of the shut-off device,
 closing time of the shut-off device and
 admission pressure of the liquid to be transported before the transport pipe.

In a preferred embodiment, the liquid to be transported is an alkylene oxide or a mixture of alkylene oxides of the formula where
$R^1$ to $R^4$, in each case independently of one another, are hydrogen or a $C_1$-$C_4$-alkyl, a $C_5$- or $C_6$-cycloalkyl or a phenyl radical, or $R^1$ and $R^3$ and/or $R^2$ and $R^4$ are in each case linked to one another to form a cycloalkyl radical, $R^1$ and $R^3$ and/or $R^2$ and $R^4$ having in total preferably 3 or 4 carbon atoms and the radicals not linked to one another if appropriate being in each case hydrogen or a $C_1$- to $C_4$ alkyl radical, or $R^1$ and $R^2$ and/or $R^3$ and $R^4$ are in each case linked to one another to form a cycloalkyl radical, $R^1$ and $R^2$ and/or $R^3$ and $R^4$ having in total in each case 2, 3, 4 or 5 carbon atoms, and the container to be filled is a reactor in which the alkylene oxide or the mixture of alkylene oxides is reacted with alkylamines or ammonia.

The alkylene oxide is preferably ethylene oxide.

Further preferred alkylene oxides are isobutylene oxide, cyclohexene oxide or styrene oxide.

Here, the generally preheated alkylamine is advantageously mixed with the alkylene oxide via a mixing valve which is part of the shut-off device and fed to the reactor, wherein the reaction takes place at superatmospheric pressure and elevated temperature. In the pipe comprising alkylene oxide, pressures and temperatures are established so that boiling of the alkylene oxide is avoided. In principle, any operating pressure required for the respective process can be established in the pipe. Frequently, pressures of from 5 to 30 or from 70 to 150 bar are used.

The inert gas used is advantageously nitrogen, a noble gas, methane or $CO_2$.

A further object of the invention is to provide a use for the method described herein above for reliably avoiding backflow of the reaction mixture from a rector for the preparation of ethanolamines, isopropanolamines, alkylalkanolamines, alkyldialkanoldiamines and/or dialkylalkanolamines by reaction of alkylene oxides with amines or ammonia.

The invention is explained in more detail below with reference to working examples and a drawing.

WORKING EXAMPLES

In an elongated tubular reactor of a continuously operated pressure plant, an amine/water mixture is reacted with ethylene oxide, abbreviated below to EO, to give alkylethanolamine. The ethylene oxide is metered into an alkylamine/water mixture at a temperature of about 90-110° C. and a pressure of about 25 to 30 bar absolute. The pressure at the end of the tubular reactor is kept at 26 bar absolute via a control valve during operation in the intended manner. The EO is compressed via a diaphragm piston pump from about 18 bar absolute (suction side) to about 39 bar absolute (pressure side) and then metered into the tubular reactor via a pressure control valve (rotary plug valve, $\Delta b=8$ to 10 bar). A fast-closing valve (ball cock, Z quality) which serves for preventing backflow is present before the pressure control valve. Installed between the diaphragm piston pump and the control zone is a pressure accumulator which is intended firstly to minimize pressure pulses on the pressure side of the pump and secondly to maintain a positive pressure difference for sufficiently long. The gas phase of the pressure accumulator is fed with nitrogen ($p_{max}=41$ bar absolute). The required level of fill of EO or the required amount of nitrogen in the pulsation damper is ensured via a level regulation.

Figure 1:
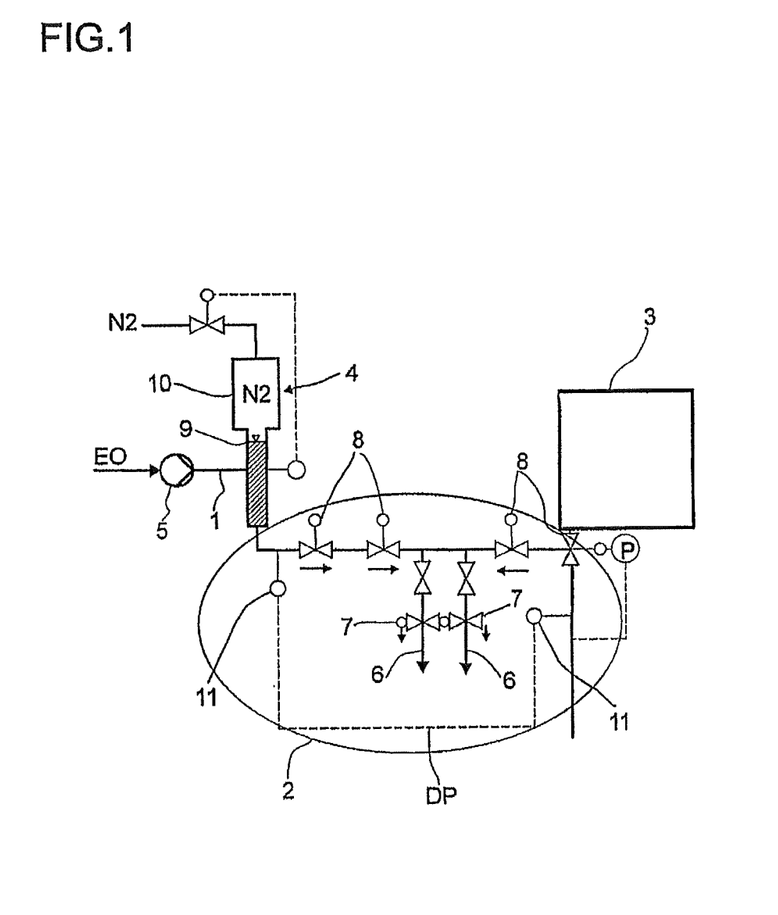
FIG. 1 shows the schematic diagram of a preferred plant for carrying out the method according to the invention.

The plant is shown schematically in FIG. 1.

The following scenario should be ensured:

It is assumed that the diaphragm piston pump in the EO pipe fails. The result is a pressure drop in the EO pipe, it being assumed as a worst case that the pressure decreases to the safety pressure in the EO network. It is furthermore assumed that the diaphragm piston pump immediately stops and is not completely tight.

Since the reactor pressure is higher than the safety pressure in the EO network, there must inevitably be backflow from the reactor into the EO pipe. The time until the onset of the backflow is determined substantially by the duration of output from the pressure accumulator since the inert gas volume present there in precompressed form and then expanding is the only factor counteracting the backflow, apart from the inertia of the EO mass in the pipeline. Within this time span, the shut-off device must have completely and tightly closed because only in this way is it ensured that no product can enter the EO pipe.

For this purpose, the pressure-tight container of the pressure accumulator is dimensioned to take into account the following boundary conditions:
minimum pressure in the reactor 20 bar absolute,
maximum pressure in the pressure-tight container of the pressure accumulator 41 bar absolute,
switching point of the differential pressure switching of the shut-off device 3.5 bar absolute,
reaction time for the shut-off device 3.5 s,
closing time of the valves of the shut-off device 2 s and
admission pressure in the ethylene oxide network 13 bar absolute.

The dimensioning of the pressure accumulator is carried out computationally using the commercially available program system SIR-3S® (release 6.3), which serves for simulating single-phase non-steady-state flow processes in pipeline systems.

Figure 2:
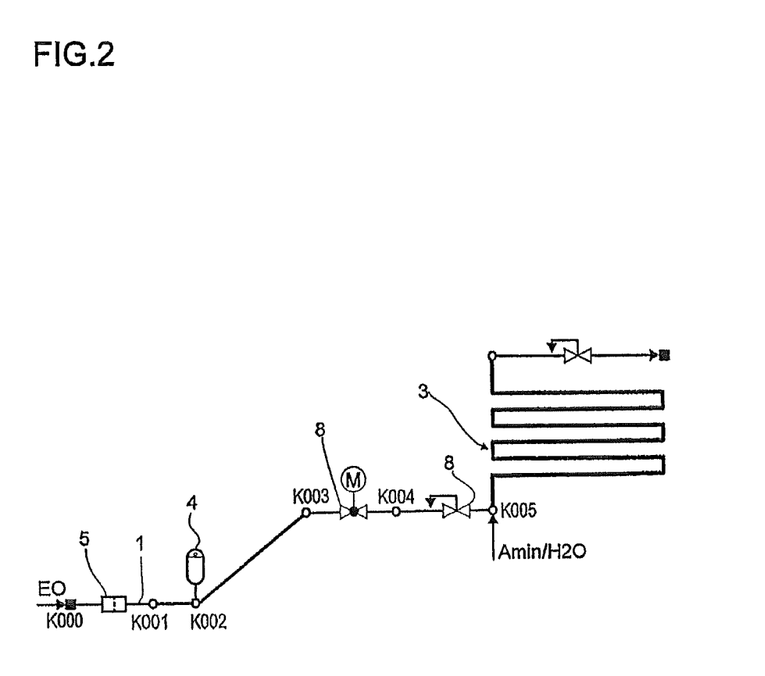
FIG. 2 shows a fluid dynamic simulation model for the plant shown in FIG. 1, FIGS. 3 to 5 show simulation results for the fluid dynamic model shown in FIG. 2

The plant shown in FIG. 1 was converted into a fluid dynamic simulation model, which is shown in FIG. 2 and in which calculation nodes K001 to K005 are specified.

For the calculation, the switching signal for the shut-off device was fixed at a pressure difference of 3.5 bar. A reaction time of the shut-off device of 3.5 s and a closing time of the valves of the shut-off device of 2 s were taken into account.

From the results of the simulation calculation, it is evident that a pressure accumulator having a total volume of 21 l, of which 4 l are filled with ethylene oxide, i.e. 17 l are filled with nitrogen, performs the desired function.

Figure 3:
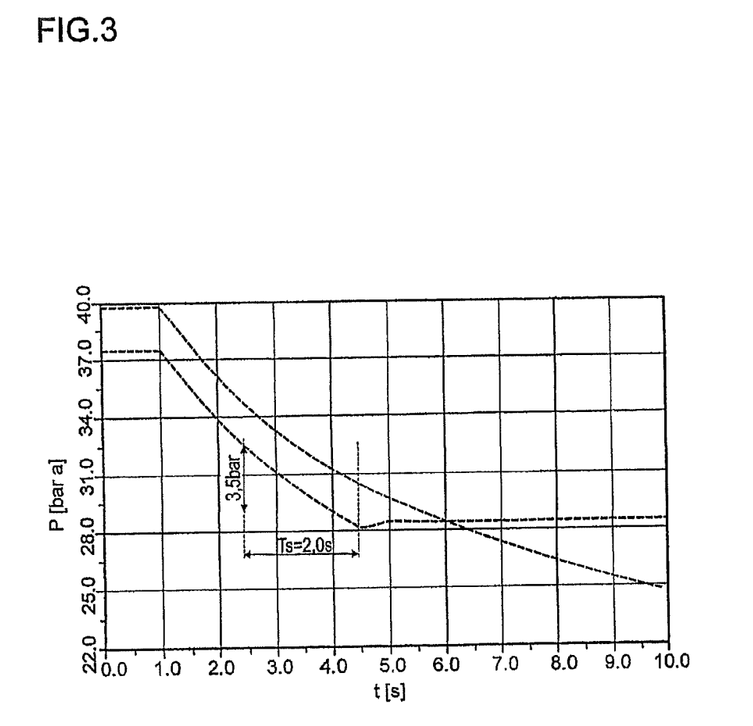
Figure 4:
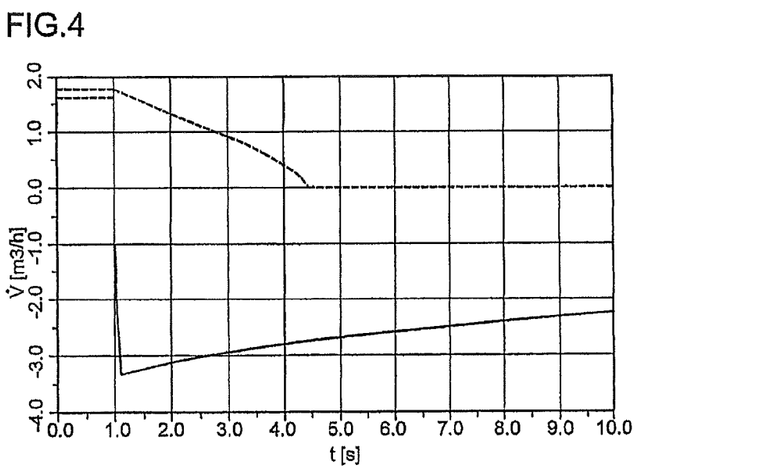
Figure 5:
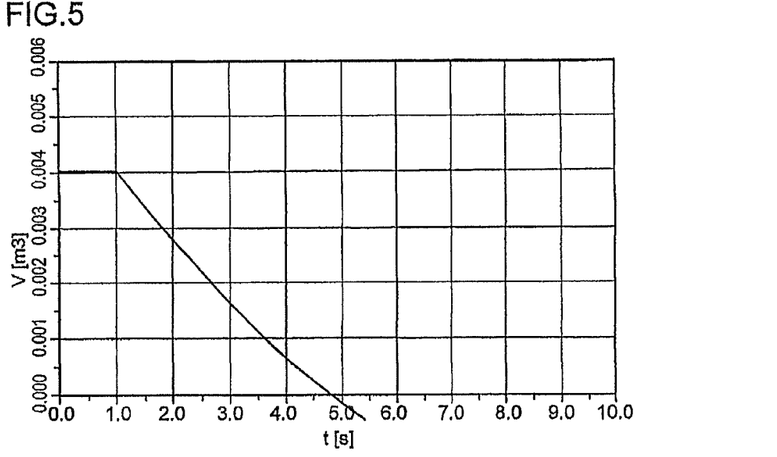

The simulation results for such a pressure accumulator are shown in FIGS. 3 to 5 and are explained below in the description of the figures.

The preferred embodiment shown schematically in FIG. 1 shows a plant for transporting ethylene oxide via a transport pipe 1 by means of a pump 5, a shut-off device 2 being arranged in the transport pipe 1, comprising a double bleed pipe 6 with double bleed valves 7, and double block valves 8 arranged on both sides thereof. The shut-off device 2 furthermore comprises pressure transducer 11 and a differential pressure measuring apparatus DP.

The liquid is transported into a container 3 which is under pressure and is filled with liquid. Arranged in the transport pipe 1 is a pressure accumulator 4 comprising a pipe 9 through which the liquid to be transported flows and which is filled with said liquid to a certain level, a nitrogen pressure buffer being present above the liquid level in a pressure-tight container 10 at the upper end of the pipe 9. FIG. 2 shows the transformation of the plant shown schematically in FIG. 1 into a fluid dynamic simulation model, the positions for the calculation nodes K000 to K005 being indicated.

FIGS. 3 to 5 show the simulation results for the pressure accumulator.

In FIG. 3, the pressure curves are plotted as a function of time for the calculation nodes K001 to K005 according to the simulation model in FIG. 2. The calculation node K001 reproduces the pressure on the pressure side of the pump 5, and the calculation node K002 designates the connection point of the pressure accumulator 4 to the EO transport pipe 1. The two calculation nodes are present at a fictional 0 m level. The switching time t[s] is plotted along the abscissa, and this is the case in the following figures too.

The calculation nodes K003, K004 and K005 are present at the 25 m level and designate the points before the fast-closing valve (K003), before the pressure control valve (K004) of the shut-off device 2 and at the feed point into the reactor 3 (K005). After failure of the feed pump 5 at simulation time t=1 s, the pressure at all five calculation nodes drops. However, as expected, it decreases more rapidly in the EO transport pipe 1 (K001-K004) than in the reactor 3 (K005), since the volume flow of amine/water is maintained in the reactor 3 and only the EO stream decreases. The steady-state pressure difference of 8 bar over the shut-off device 2 in the EO transport pipe 1 between the points K003 and K005 decreases with increasing duration until it reaches the value of 3.5 bar at the simulation time 2.4 s. Thus, the switching point for the shut-off device 2 is reached and the closing process begins. In this simulation, the closing process is started 100 ms later (to take account of a possible signal lag time), i.e. at time t=2.5 s. The closing process ends 2 s later, at simulation time 4.5 s. Backflow which would manifest itself in a negative pressure difference between the calculation nodes K004 and K005 does not occur up to the time 4.5 s.

That no backflow is recorded is also confirmed by the volume flow rate curves in FIG. 4. The volume flow rate through the control valve (K004-K005) is always positive. The diagram also clearly shows that the "leakage volume flow rate" through the pump 5 ("5 mm hole") is greater than the volume flow rate in the direction of reactor 3. The greater part of the EO volume fed in from the pressure accumulator 4 is therefore "lost", i.e. is not available at all for maintaining a positive volume flow rate in the direction of reactor 3. For this reason, the volume of the pressure accumulator 4 must be chosen greater than would be necessary if the leakage stream through the pump need not have been taken into account.

FIG. 5 shows the EO volume in the pressure accumulator 4. At time 4.5 s, when the shut-off device 2 has completely closed, there is still a small volume of EO (ca. 0.2 l) in the pressure accumulator 4. In the present example, it is also ensured that the transport pipe 1 was full of EO until complete closing of the shut-off device 2.

From the results, it is therefore possible to derive that a pressure accumulator having a total content of 21 l, including 4 l filled with EO, is adequately dimensioned to ensure, under the preconditions and boundary conditions described, that a positive pressure difference is maintained until the shut-off device has completely closed.

Figure 6:
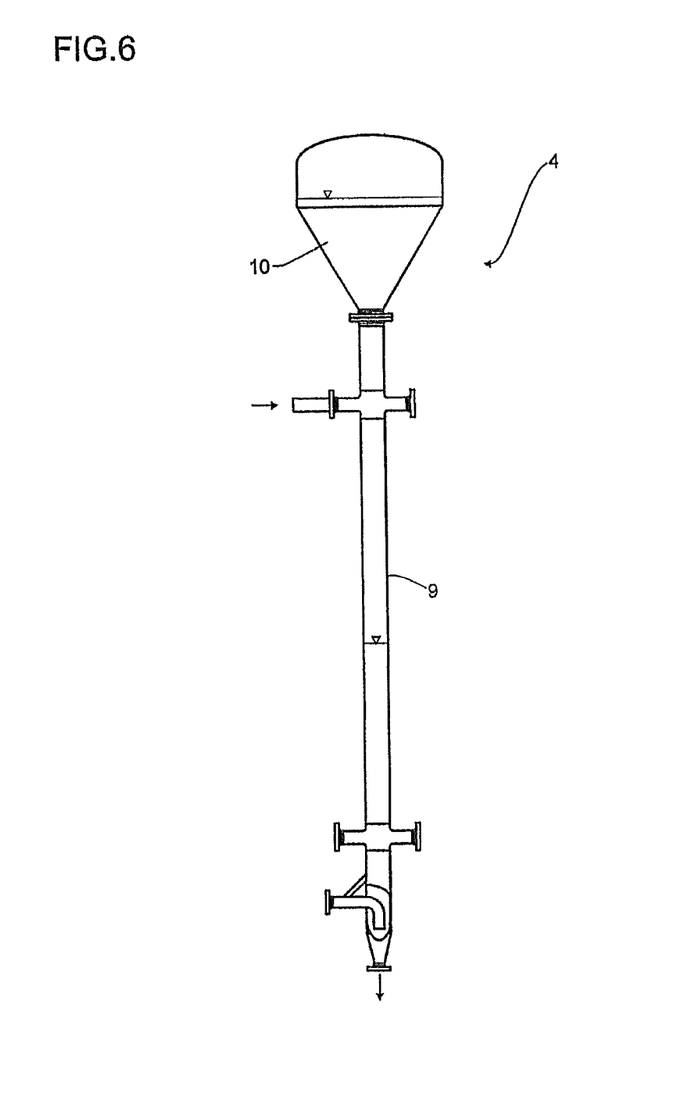
FIG. 6 shows a preferred embodiment for a pressure accumulator.

FIG. 6 shows a preferred embodiment for a pressure accumulator, comprising vertically arranged pipe 9 which, at its upper end, connects to a container 10, comprising conical transition part which connects to a cylindrical part. Advantageously, as shown in the figure, the liquid to be transported is fed to the upper region of the vertically arranged pipe and passed on at the lower end thereof, resulting in thorough mixing of the liquid in the pressure accumulator.

We claim:

1. A method for avoiding backflow comprising transporting a first liquid under pressure via a transport pipe into a container, the transport pipe including a shut-off device with differential pressure switching and the container being under pressure and containing a second liquid in direct contact with the first liquid with the second liquid being the same as or different from the first liquid, the method further comprising:
   filling a pressure accumulator with the first liquid up to a predetermined level above a liquid level;
   providing an inert gas in the transport pipe upstream from the shut-off device in the transport direction and in the pressure accumulator under an excess pressure in an amount relative to the container to be filled, shutting off the shut-off device when there is a pressure drop in the transport pipe, the inert gas providing a positive pressure difference to offset a drop in pressure in the transport pipe to the container over a period which is at least as long as a reaction time of the shut-off device to prevent backflow in the transport pipe during the time period from a detection of a triggering signal for shut-off to complete closing of the shut-off device, the shut-off device having an emptying pipe with an emptying valve.

2. The method according to claim 1, wherein the second liquid is the same as the first liquid.

3. The method according to claim 1, further comprising transporting the first liquid in the transport pipe by means of a pump.

4. The method according to claim 3, wherein the pump is a volumetric pump.

5. The method according to claim 4, wherein the volumetric pump is one of a piston pump, a diaphragm pump or a gear pump.

6. The method according to claim 3, wherein the pump is a centrifugal pump.

7. The method according to claim 6, wherein the centrifugal pump includes backflow-reducing devices.

8. The method according to claim 7, wherein the backflow-reducing devices comprise one or more nonreturn valves arranged on the pressure side of the centrifugal pump.

9. The method according to claim 1, wherein the emptying pipe with emptying valve is a single emptying pipe with single emptying valve, and wherein a single block closing valve is provided on each side of the single emptying pipe with single emptying valve to comprise two block closing valves.

10. The method according to claim 1, wherein the emptying pipe with emptying valve is a double emptying pipe with double emptying valve, and wherein in each case a double block closing valve is provided on both sides of the double emptying pipe with double emptying valve.

11. The method according to claim 1, wherein the pressure accumulator has a vertically arranged pipe with a device for liquid level measurement which connects at its upper end to a container.

12. The method according to claim 11, wherein the vertically arranged pipe has a length in the range from 1 to 5 m and a diameter in the range from 100 to 300 mm.

13. The method according to claim 11, wherein the vertically arranged pipe has a length in the range from 4 to 5 m, and a diameter in the range from 90 to 150 mm.

14. The method according to claim 11, wherein the first liquid is fed into the upper region of the vertically arranged pipe and is passed on at the lower end thereof.

15. The method according to claim 1, wherein the dimensioning of the container at the upper end of the pressure accumulator is effected taking into account the following boundary conditions:
   minimum pressure in the container,
   maximum pressure in the container at the upper end of the pressure accumulator,
   switching point and reaction time of the shut-off device
   closing time of the shut-off device and
   admission pressure of the liquid to be transported before the transport pipe.

16. The method according to claim 1, wherein the liquid transported is an alkylene oxide or a mixture of alkylene oxides of the formula where
   $R^1$ to $R^4$, in each case independently of one another, are hydrogen or a $C_1$-$C_4$-alkyl, a $C_5$- or $C_6$-cycloalkyl or a phenyl radical
   or $R^1$ and $R^3$ and/or $R^2$ and $R^4$ in each case are linked to one another to form a cycloalkyl radical, $R^1$ and $R^3$ and/or $R^2$ and $R^4$ having in total preferably 3 or 4 carbon atoms and the radicals not linked to one another if appropriate being in each case hydrogen or a $C_1$- to $C_4$-alkyl radical
   or $R^1$ and $R^2$ and/or $R^3$ and $R^4$ are in each case linked to one another to form a cycloalkyl radical, $R^1$ and $R^2$ and/or $R^3$ and $R^4$ having in total in each case 2, 3, 4 or 5 carbon atoms.

17. The method according to claim 16, wherein the alkylene oxide is ethylene oxide and/or propylene oxide.

18. The method according to claim 16, wherein the alkylene oxide is isobutylene oxide, cyclohexene oxide or styrene oxide.

19. The method according to claim 1, wherein the inert gas is nitrogen, a noble gas, methane or $CO_2$.

20. The use of the method according to claim 1 for reliably avoiding backflow of the reaction mixture from a reactor for the preparation of ethanolamines, isopropanolamines, alkylalkanolamines, alkyldialkanoldiamines and/or dialkylalkanolamines by reaction of alkylene oxides with amines or ammonia.

* * * * *